(12) United States Patent
Yamamoto et al.

(10) Patent No.: US 8,692,846 B2
(45) Date of Patent: Apr. 8, 2014

(54) IMAGE PROCESSING APPARATUS, METHOD FOR RETOUCHING IMAGES BASED UPON USER APPLIED DESIGNATED AREAS AND ANNOTATIONS

(75) Inventors: Naoko Yamamoto, Yokohama (JP); Tsutomu Inose, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/308,771

(22) Filed: Dec. 1, 2011

(65) Prior Publication Data
US 2012/0147053 A1 Jun. 14, 2012

(30) Foreign Application Priority Data
Dec. 14, 2010 (JP) .................................. 2010-278566

(51) Int. Cl.
G09G 5/00 (2006.01)
G06K 9/36 (2006.01)
G06K 9/20 (2006.01)

(52) U.S. Cl.
USPC .......................................... 345/619; 382/284

(58) Field of Classification Search
USPC ....................................................... 345/619
See application file for complete search history.

(56) References Cited

U.S. PATENT DOCUMENTS

| 4,882,692 A * | 11/1989 | Saxton et al. ................. 345/661 |
| 8,036,895 B2 * | 10/2011 | Kurzweil et al. ............. 704/270 |
| 8,218,830 B2 * | 7/2012 | Gavin et al. .................. 382/118 |
| 8,416,451 B2 * | 4/2013 | Rolleston et al. ............. 358/1.9 |
| 2005/0071864 A1 * | 3/2005 | Denoue et al. .................... 725/9 |
| 2005/0128516 A1 * | 6/2005 | Tomita ........................ 358/1.15 |
| 2005/0264832 A1 * | 12/2005 | Baum et al. .................... 358/1.2 |
| 2005/0278636 A1 * | 12/2005 | Nomoto ........................ 715/724 |
| 2008/0279427 A1 * | 11/2008 | Takagi .......................... 382/118 |
| 2010/0201793 A1 * | 8/2010 | Kurzweil et al. ............... 348/62 |
| 2010/0266205 A1 * | 10/2010 | Kurzweil et al. ............. 382/182 |
| 2010/0306645 A1 * | 12/2010 | Roulland et al. ............. 715/271 |
| 2010/0331043 A1 * | 12/2010 | Chapman et al. .......... 455/556.1 |
| 2012/0327211 A1 * | 12/2012 | Yamamoto ...................... 348/79 |

FOREIGN PATENT DOCUMENTS

| JP | 2004-289706 A | 10/2004 |
| JP | 2005-267454 A | 9/2005 |
| JP | 2008-059534 A | 3/2008 |
| JP | 2009-080815 A | 4/2009 |

* cited by examiner

*Primary Examiner* — Carlos Perromat
(74) *Attorney, Agent, or Firm* — Canon USA Inc. IP Division

(57) ABSTRACT

Evaluation and an area to which the evaluation is added are identified in an image, and the image is processed based on a rule for processing the image and the identified evaluation and area.

16 Claims, 12 Drawing Sheets

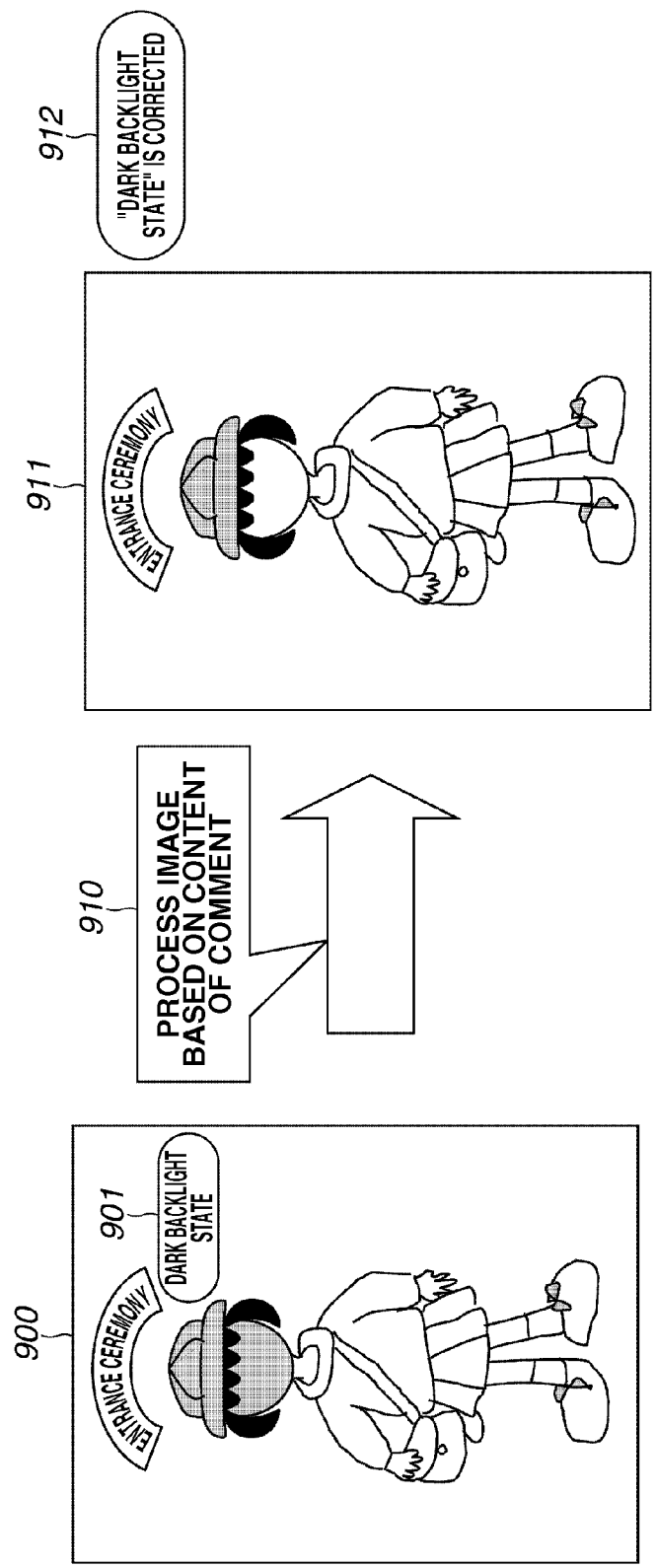

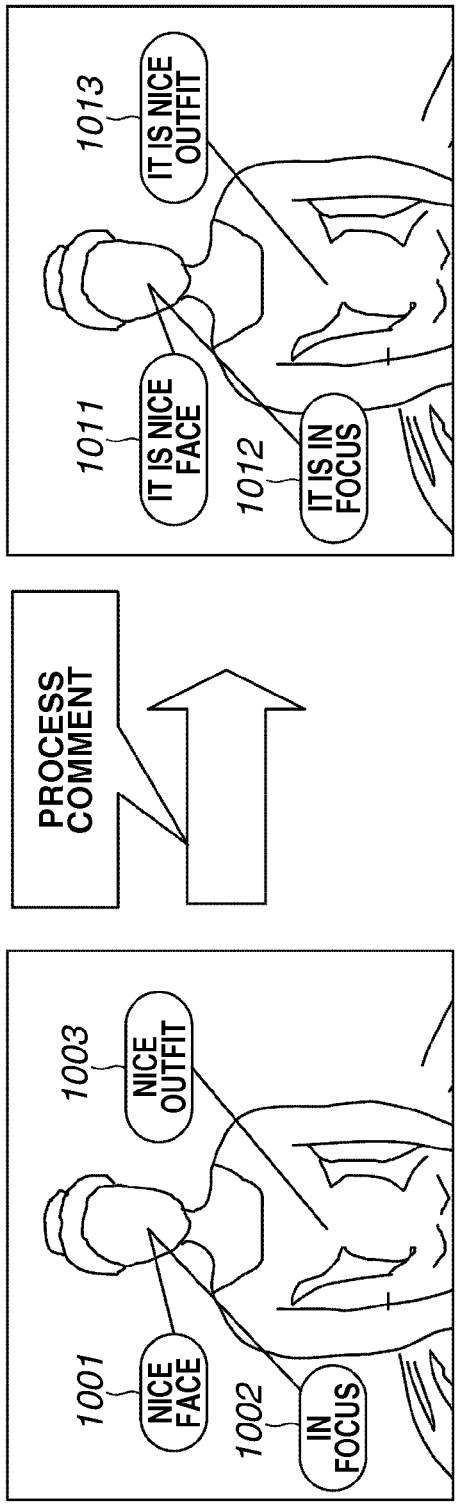

IMAGE PROCESSING APPARATUS, METHOD FOR RETOUCHING IMAGES BASED UPON USER APPLIED DESIGNATED AREAS AND ANNOTATIONS

BACKGROUND OF THE INVENTION

1. Field of the Invention

The present invention relates to an image processing apparatus and an image processing method.

2. Description of the Related Art

Conventionally, there have been widely spread a service for registering an image shot in a studio or the like onto a server on the Internet to allow a customer to view the shot image from the customer's personal computer (PC) at home via, for example, the World Wide Web (Web), and a service for generating a photo book with use of the shot image.

The above-described services provide users with an extra value added to an image shot in a studio or an image on a server by, for example, applying image processing to the image or adding some effects to the image at the time of a display of the image. Examples of known conventional techniques for simplifying such an image processing work include a technique for allowing a user to select an area in an image and displaying a menu of the image processing to be applied to the selected area, thereby reducing user's time and effort required for the image processing (United States Patent Publication Application No. 2005/0278636).

There is discussed a technique for referring to information indicating whether processing such as face detection, red-eye detection, and a red-eye correction has been already applied to the image from an exchangeable image file format (Exif) tag of the image data, and applying the processing to the image if the image has not received the processing yet (United States Patent Publication Application No. 2008/0279427). Further, examples of known methods for effectively displaying a shot image include a technique for performing zooming/panning focusing on a face area, for example, when face areas or a face area and an in-focus area overlap with each other (Japanese Patent Application Laid-Open No. 2009-080815).

An increase in the capacities of storage apparatuses in recent years has led to user's necessity of handling a large number of images, resulting in a growing demand for simplification of works for image processing. However, in the image processing method discussed in United States Patent Publication Application No. 2005/0278636, a user needs to select an area in an image to which image processing is applied, and therefore this method sill needs to be improved in terms of simplification of works for image processing.

The technique discussed in United States Patent Publication Application No. 2008/0279427 only applies a certain type of processing to an image if this processing is not yet applied to the image, and the applied processing is not necessarily the processing that a user wants to apply. The image display technique discussed in Japanese Patent Application Laid-Open No. 2009-080815 is subject to such an issue that, although this technique displays an image while prioritizing a face or an in-focus position in the image, such an area is not necessarily a valuable area. For example, for an image shot when a person closed his/her eyes or a person showed an undesired face, the user may rather want to avoid such processing that the face is especially emphasized.

SUMMARY OF THE INVENTION

The present invention is directed to an image processing apparatus and an image processing method that apply image processing while simplifying what a user needs to do for the image processing.

According to an aspect of the present invention, an image processing apparatus includes an identification unit configured to identify a specified area in an image and evaluation added to the specified area, an acquisition unit configured to acquire a rule for processing the image, and a processing unit configured to process the image based on the evaluation and the specified area identified by the identification unit, and the rule acquired by the acquisition unit.

According to the present invention, it is possible to automatically apply image processing to the image based on the rule.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of an image processing result according to a third exemplary embodiment.

FIG. 10 illustrates an example of comment processing according to a fifth exemplary embodiment.

DESCRIPTION OF THE EMBODIMENTS

Various exemplary embodiments, features, and aspects of the invention will be described in detail below with reference to the drawings.

Figure 1:
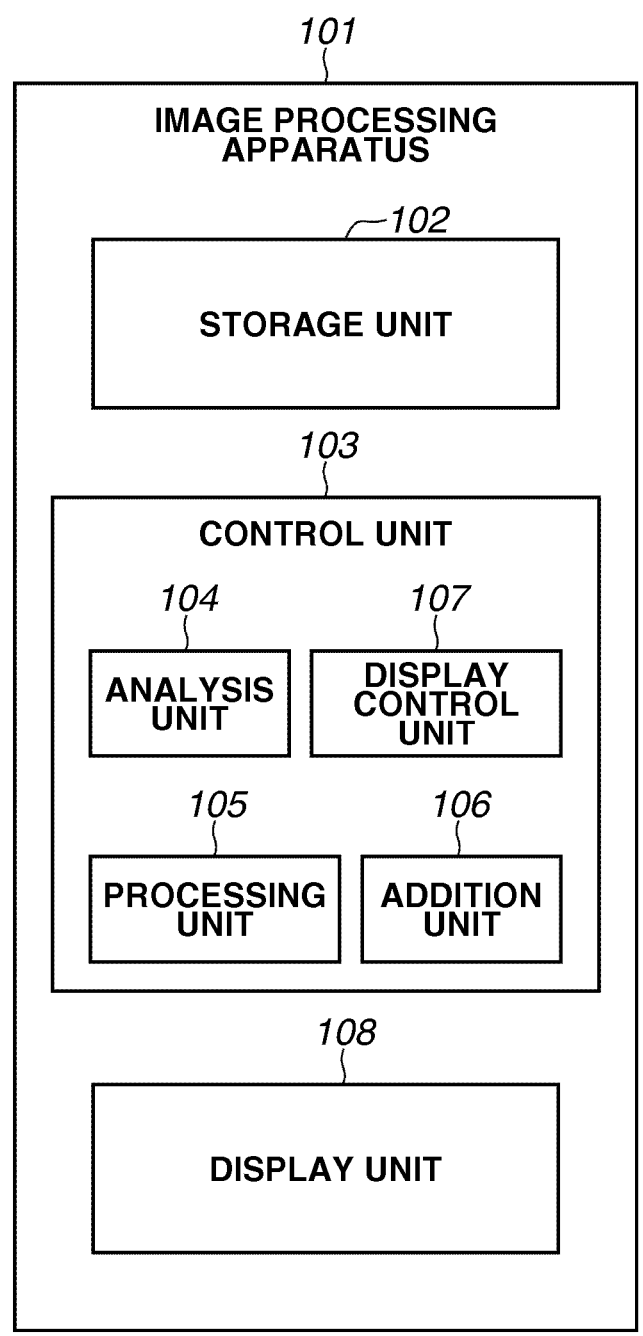
FIG. 1 illustrates a functional configuration of an image processing apparatus according to an exemplary embodiment of the present invention.

A first exemplary embodiment provides a plurality of images which are generated by processing a single image based on comments added to the image as predetermined evaluations. FIG. 1 illustrates an example of a functional configuration of an image processing apparatus according to the present exemplary embodiment.

An image processing apparatus 101 includes a storage unit 102, a control unit 103, and a display unit 108. The image processing apparatus 101 processes and displays an image, to which a comment is added in advance, based on the comment. The storage unit 102 is a storage apparatus storing an image with comment (i.e., a commented image) input into the image processing apparatus 101. The control unit 103, for example, executes calculations and logical determinations for various types of processing, and controls the respective constituent elements. Further, the control unit 103 includes an analysis unit 104, a processing unit 105, an addition unit 106, and a display control unit 107.

The analysis unit 104 analyzes a commented image based on the comment. The processing unit 105 applies image processing to the commented image based on the comment analyzed by the analysis unit 104 and an area where the comment is added in the image. As will be used herein, "image processing" means generation of a new image by applying processing and retouching an original image. Examples of image processing include image edition processing such as trimming, scaling, rotation, a color correction, and a brightness correction, and a combination thereof. The addition unit 106 adds a comment to an image. The display control unit 107 performs display control so as to display an image generated by the processing unit 105 on the display unit 108 while chronologically changing the image.

Figure 2:
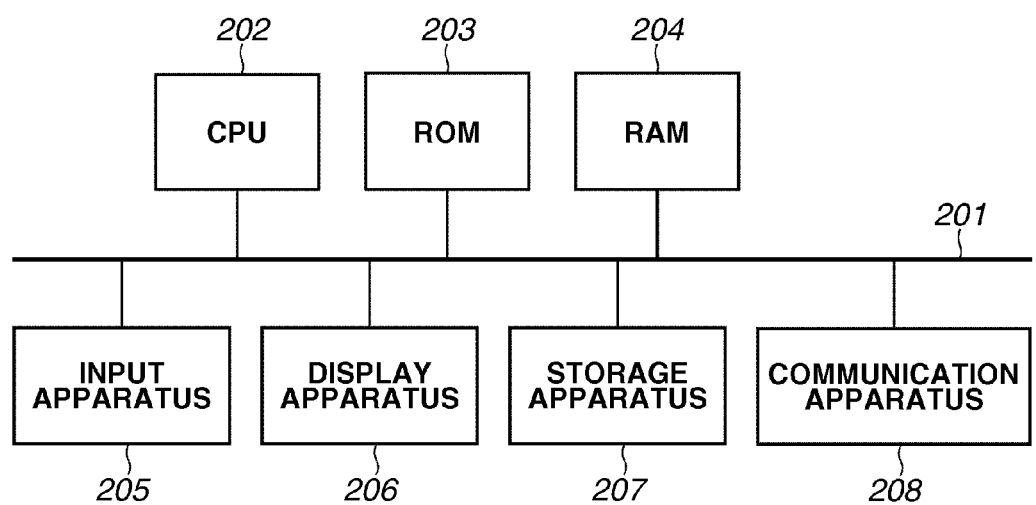
FIG. 2 is a block diagram illustrating an example of a hardware configuration of the image processing apparatus according to the exemplary embodiment of the present invention.

Next, FIG. 2 is a block diagram illustrating an example of a hardware configuration of the image processing apparatus 101 according to the present exemplary embodiment. A central processing unit (CPU) 202, for example, performs calculations and logical determinations for various types of processing, and controls the respective constituent elements connected to a bus 201. The image processing apparatus 101 is provided with a memory including a program memory and a data memory. A read only memory (ROM) 203 functions as the program memory, and stores a program, which includes processing procedures illustrated in flowcharts described below, for realizing control by the CPU 202. A random access memory (RAM) 204 functions as the work memory of the CPU 202. The ROM 203 may serve as the program memory, or the RAM 204 may serve as the program memory to which a program is loaded from an external storage apparatus or the like. The control unit 103 illustrated in FIG. 1 can be realized by the CPU 202, the ROM 203, and the RAM 204.

An input apparatus 205 from which a user inputs information may include, for example, a mouse, a touch panel, and a keyboard. A display apparatus 206 may include, for example, a cathode ray tube (CRT) display and a liquid crystal display. The display unit 108 is realized by, for example, the display apparatus 206. A storage apparatus 207 such as a hard disk drive (HDD) stores a commented image. The storage unit 102 is realized by, for example, the storage apparatus 207. A communication apparatus 208 can communicate with, for example, another information apparatus via a network. The image processing apparatus 101 maybe configured in such a manner that, for example, an image stored in the storage unit 102 and video information output to the display unit 108 are input and output via the communication apparatus 208.

An example of a commented image stored in the storage unit 102 will be described with reference to FIG. 5. In the present exemplary embodiment, comments 501 to 503 are added to a commented image 500 as predetermined evaluations of areas in the image. In the present exemplary embodiment, there are a plus/minus comment and a memo comment. The plus/minus comment indicates whether a specific portion (specified area) in an image is good or bad by a score. The memo comment indicates a reason or a basis for addition of the plus/minus comment. In the present exemplary embodiment, a plus/minus comment and one or more memo comments are added to one area while the plus/minus comment and the memo comment are associated with each other. Further, the comment added to the image contains coordinate information and range information of the specified area which is a comment addition position in the image.

Figure 5:
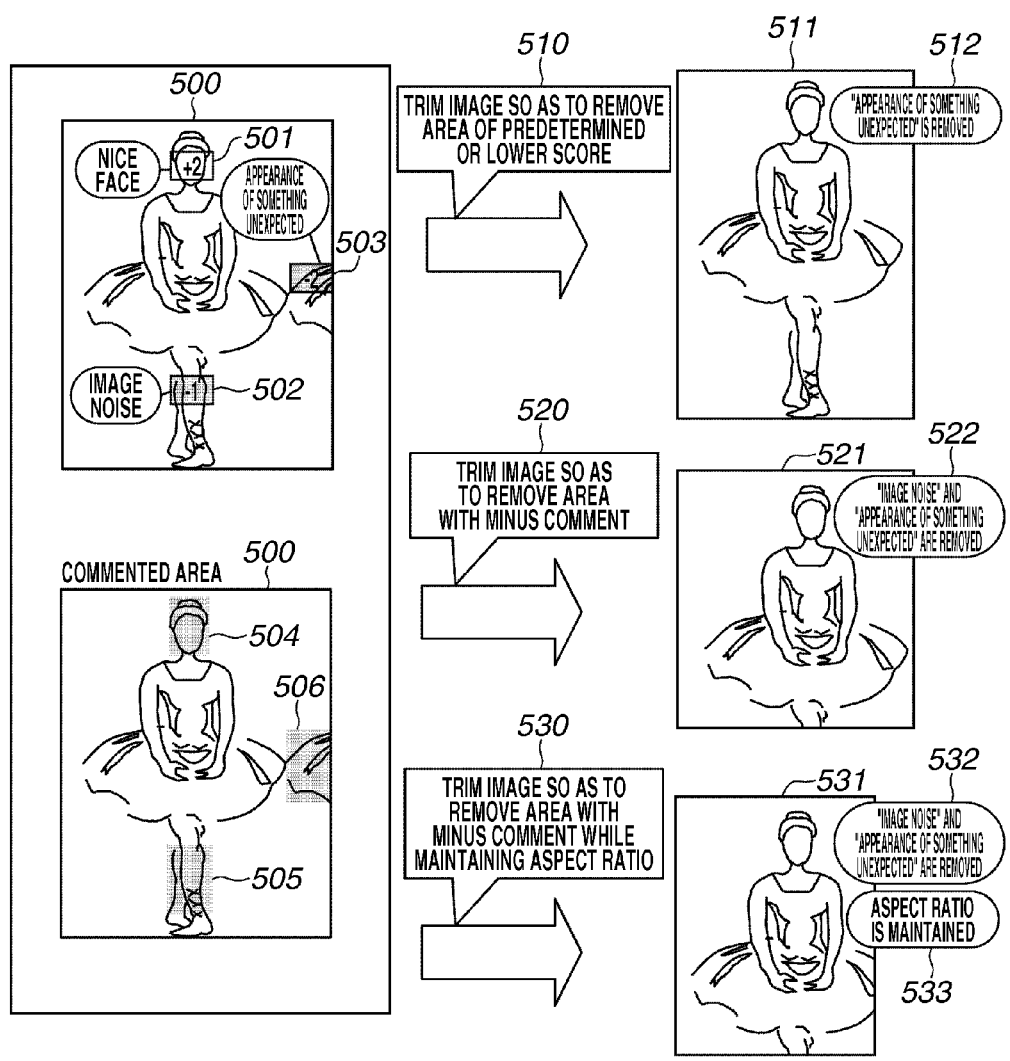
FIG. 5 illustrates an example of a commented image, image processing rules, and image processing results.

In the commented image 500 illustrated in FIG. 5, the comment 501 includes a plus comment indicating that the area is "good" with plus two points assigned thereto. Further, the comment 501 includes a memo comment "NICE FACE" together with the plus comment. The comment 501 is added to an area 504, and includes information regarding the position and the range of the area 504. On the other hand, the comments 502 and 503 each include a minus comment indicating that the area is "not good". Minus one point and minus two points are set to the comments 502 and 503, respectively. Further, the comment 502 includes a memo comment "image noise", and the comment 503 includes a memo comment "appearance of something unexpected". The comments 502 and 503 are added to areas 505 and 506, respectively. The memo contents may include the following contents; as examples of plus comment, there are "in focus" which indicates a shooting condition such as a focus state, and "beautiful" which indicates a subject's condition. Further, as an example of minus comment, there is "blur occurs".

The comment may be added as metadata of image data, or may be stored as separate data from the image data but correspond to the image data. Data regarding the comment contains at least the coordinate information indicating a specific portion (specified area) in an image to which the comment is added (or information indicating that the comment is directed to a whole image), and a comment content. The comment content (memo content) may be input as text data or as an identification code allowing the image processing apparatus 101 to interpret the comment content. If an image is shot in, for example, a studio, the comment is added by, for example, a studio staff member in advance.

An operation of the image processing apparatus 101 with above-described configuration according to the present exemplary embodiment will be described with reference to the drawings. First, an overall processing flow of the image processing apparatus 101 according to the present exemplary embodiment will be described with reference to FIG. 3.

In step S301, the image processing apparatus 101 inputs and acquires a commented image which is set as a processing target. The commented image is image data managed by the image processing apparatus 101, and is stored in the storage unit 102 in the present exemplary embodiment.

Subsequently, in step S302, the image processing apparatus 101 acquires a rule for processing the image. The image processing rule is a rule defining how an image is processed based on a comment added to the image. For example, the rule defines how to apply image edition processing such as trimming, scaling processing, rotation processing, a color correction, and a brightness correction, or a combination thereof to a target image based on a comment. The rule is stored in the storage unit 102, and is read into, for example the RAM 204. The rule may be selected or acquired according to a user's input.

In step S303, the image processing apparatus 101 applies required image processing to the commented image acquired in step S301 based on the rule acquired in the previous step, step S302. In step S304, the image processing apparatus 101 performs various types of processing based on the result of the image processing in step S303. For example, the image processing apparatus 101 displays the result on the display unit 108, or stores the image generated by the applied image processing in association with the original image in the storage unit 102.

The image processing performed in step S303 illustrated in FIG. 3 will be described in detail with reference to FIG. 4.

In step S401, the analysis unit 104 acquires the coordinate information, the score of the comment, and the content of the memo comment of the commented area in the target image acquired in step S301. Then in step S402, the analysis unit 104 acquires the image processing rule from the storage unit 102. Examples of image processing rules include, for example, "trim the image based on the area with plus/minus comment to generate a new image", "correct the image based on the content of the memo comment", and "blur the area with the minus comment".

Subsequently, in step S403, the analysis unit 104 analyzes the image based on the acquired image processing rule and the comment. The analysis unit 104 acquires information for satisfying the content of the image processing rule by analyzing the image. For example, the analysis unit 104 analyzes the content of the acquired comment to determine, for example, whether the comment is a plus comment or a minus comment, to locate the position of the commented area, and to acquire the relative positional relationship of the commented area. Further, the analysis unit 104 can interpret the content of the comment by a natural language processing technology (a known technology) or by referring to an identification code table stored in the image processing apparatus 101 in advance.

Subsequently, in step S404, the processing unit 105 processes the image based on the analysis result of the analysis unit 104 to generate a new image. In step S405, the addition unit 106 adds information regarding the content of the processing performed in step S404 to the newly generated image as a comment. In step S406, the information processing apparatus 101 outputs the generated image as a result.

The above-described image processing will be described in further detail with reference to FIG. 5. FIG. 5 illustrates an example of the commented image, the image processing rules, and the image processing results. The image 500 is the target image input in step S301. The comments 501 to 503 are added to the image 500.

In step S401, the analysis unit 104 acquires the image comments 501, 502, and 503 of the image 500. Further, in this example, the image processing rules that the analysis unit 104 acquires from the storage unit 102 in step S402 are the following three rules; a rule 510 "trim image so as to remove area of predetermined or lower score", a rule 520 "trim image so as to remove area with minus comment", and a rule 530 "trim image so as to remove area with minus comment while maintaining original aspect ratio".

In step S403, the analysis unit 104 first specifies an area to which a comment of a predetermined or lower score is added according to the rule 510 "trim image so as to remove area of predetermined or lower score". In the present exemplary embodiment, the predetermined score is set to minus two points. This predetermined score may be a score determined in advance, or acquired from a user's input. The analysis unit 104 acquires the information about the position and size of the area 506 with the comment 503, which is the comment of minus two or lower points added to the image 500.

Then, the analysis unit 104 specifies an area to which a minus comment is added according to the rule 520 "trim image so as to remove area with minus comment". The analysis unit 104 acquires the information of the specified areas (the areas 505 and 506) which are the addition positions of the minus comments 502 and 503 added to the image 500.

Subsequently, the analysis unit 104 specifies an area with a minus comment added thereto according to the rule 520 "trim image so as to remove area with minus comment" and the rule 530 "trim image so as to remove area with minus comment while maintaining original aspect ratio". The analysis unit 104 acquires the information of the addition positions (the areas 505 and 506) of the minus comments 502 and 503 added to the image 500. Further, the analysis unit 104 acquires the aspect ratio of the image 500.

In step S404, the processing unit 105 processes the image based on the analysis result of the analysis unit 104. The processing unit 105 trims the image so as to reserve the original image area as much as possible and remove the area with minus two or lower score according to the rule 510, and generates a new image. With respect to the image 500, the processing unit 105 trims the image into a rectangular area that does not include the position where the comment 503 is added to (the area 506) to newly generate an image 511.

Subsequently, the processing unit 105 trims the image so as to reserve the original image area as much as possible and remove the areas with the minus comment according to the rule 520, and generates a new image. With respect to the image 500, the processing unit 105 trims the image into a rectangular area that does not include the positions with the minus comments 502 and 503 (the areas 505 and 506) to newly generate an image 521.

Subsequently, the processing unit 105 trims the image so as to reserve the original image area as much as possible and remove the areas with the minus comment while maintaining the aspect ratio according to the rule 530, and generates a new image. With respect to the image 500, the processing unit 105 trims the image into a rectangular area that does not include the positions with the minus comments 502 and 503 (the areas 505 and 506) while maintaining the same aspect ratio as the image 500 to newly generate an image 531.

In step S405, the addition unit 106 newly adds a comment based on the processing content to each image generated in step S404. The addition unit 106 newly adds a comment 512 "appearance of something unexpected is removed" to the image 511 generated according to the rule 510 by referring to the removed comment 503 "appearance of something unexpected". Then, the addition unit 106 newly adds a comment 522 "image noise and appearance of something unexpected are removed" to the image 521 generated according to the rule 520 by referring to the removed comments 502 "image noise" and 503 "appearance of something unexpected".

Subsequently, the addition unit 106 newly adds a comment 532 "image noise and appearance of something unexpected are removed" and a comment 533 "aspect ratio is maintained" to the image 531 generated according to the rule 530 by referring to the removed comments 502 and 503. The image processing apparatus 101 may be configured in such a manner that the whole image is regarded as the addition area of the newly added comment or the vicinity of the position to which the removed comment was added is regarded as the addition area of the newly added comment. In step S406, the image processing apparatus 101 outputs the newly generated commented images 511, 521, and 531 as data, and ends the image processing.

Figure 6:
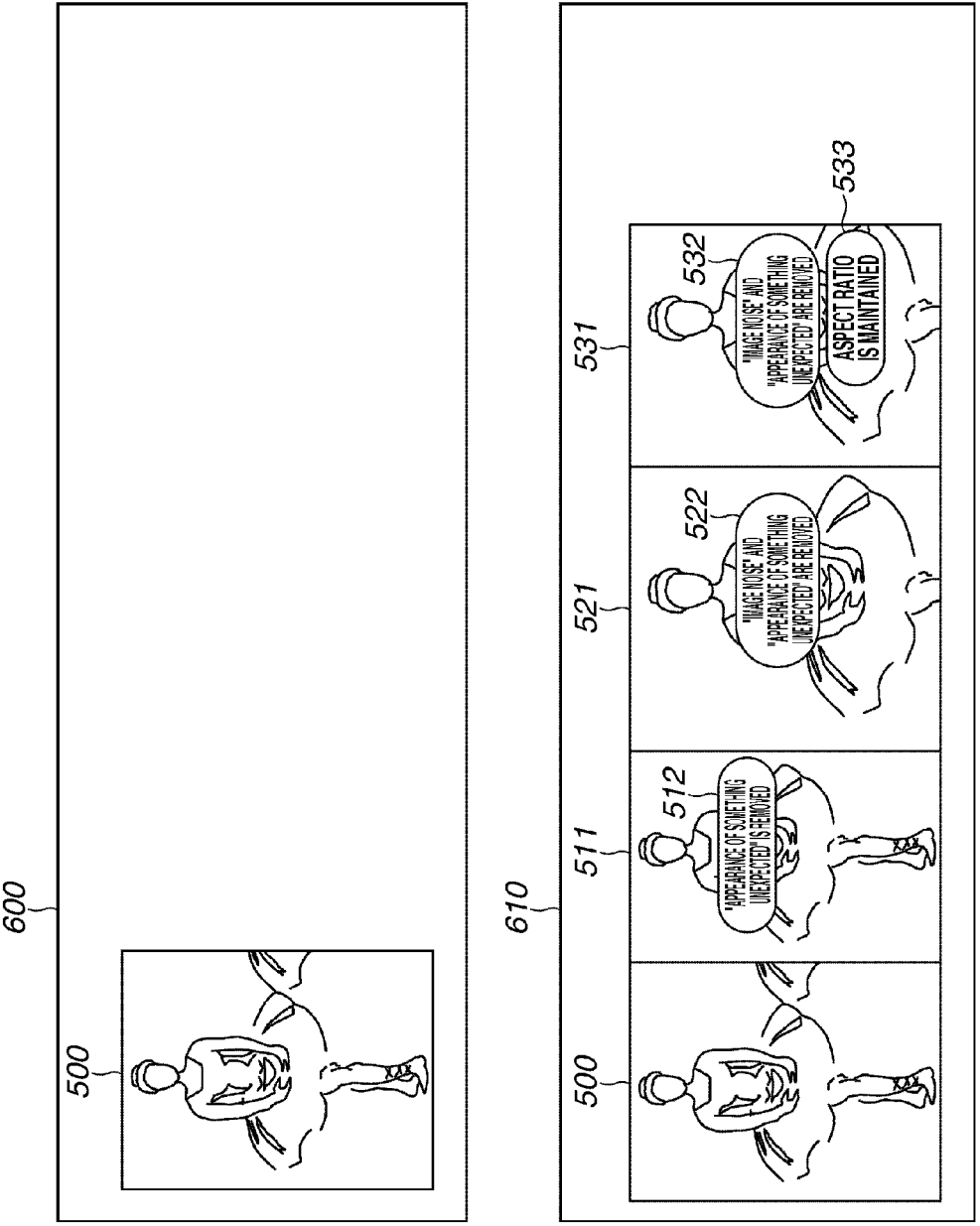
FIG. 6 illustrates an example of a display of the image processing results.

Next, processing for displaying generated images will be described as an example of processing based on an image processing result in step S304 illustrated in FIG. 3. FIG. 6 illustrates an example of a display result of the display unit 108 in step S304. In FIG. 6, a display screen 600 is an example of a screen displaying only the input image 500 illustrated in FIG. 5. A display screen 610 is an example of a screen collectively displaying the input image and the images generated by the image processing. The images 511, 521, and 531 generated by the image processing are displayed together with the comments added in step S405.

According to the present exemplary embodiment, for example, when a user wants to generate a photo book with use of an input image, the input image is displayed together with an image automatically generated by image processing, as indicated by the display screen 610. Therefore, it is possible to increase the number of options for the image that a user can adopt. Further, it is possible to reduce user's time and effort required for image processing.

Further, according to the present exemplary embodiment, since an image is displayed together with a comment indicating the processing content, a user can easily understand what type of processing is applied to the input image. In the present exemplary embodiment, the comments indicating the processing contents are displayed together with the generated images 511, 521, and 531. However, the comment may be switched to be displayed or hidden according to a user's operation from the input apparatus 205. Such configuration enables a user to easily understand the processing content, the overall appearance of the generated image, and a difference between the input image and the generated image.

Further, the image processing apparatus 101 may be configured in such a manner that a comment is switched to be displayed or hidden according to a person who added the comment or a position where the comment was added. For example, consider a case that a camera operator upload an image with a comment in a studio to a network, and then an unspecified number of people can add comments to the image. In this case, the reliability of each comment varies depending on the person who added the comment. Therefore, the image processing apparatus 101 acquires the information regarding a person who added a comment and controls the display according to the person.

A comment display may be based on a selection of a person who added a comment, and whether a comment is displayed or hidden may be switched according to the time when the comment was added. The information processing apparatus 101 can realize the display control according to a person by storing the information enabling identification of a person who added a comment and a location where a comment was added as metadata of the image in association with the comment, and acquiring this information.

As described above, according to the present exemplary embodiment, it is possible to apply processing to an image based on a comment added to the image. Therefore, it is possible to process an image based on the comment of the image so as to reserve a good area or remove a bad area in the image to generate a new image. Further, since a new image is automatically generated by processing an original image, it is possible to recommend or suggest image processing for a user. Further, since image processing can be automated, it is possible to reduce user's time and effort required for image processing.

Further, a user can understand a reason for processing and a difference between a processed image and an original image even though the image is automatically processed, since the user can recognize the content of the image processing from the comment. Further, it is possible to suggest a plurality of processed images according to a plurality of rules to a user. Therefore, a user can have an increased number of options for the image that the user can adopt, and select a desired image.

A second exemplary embodiment will be described based on another example of an image processing rule different from the image processing rules described in the first exemplary embodiment. According to the present exemplary embodiment, an image is processed while considering the balance of the image to be output by the image processing. The configuration of the image processing apparatus according to the present exemplary embodiment is similar to the configuration of the first exemplary embodiment, except that the analysis unit 104 in the present exemplary embodiment can perform face detection and object detection in an image. The CPU 202 executes a program using a known technique such as pattern matching, and realizes the face detection and the object detection.

The image processing according to the present exemplary embodiment is similar to the flowchart illustrated in FIG. 4, and differences from the first exemplary embodiment will be described below in detail. In the present exemplary embodiment, in step S402 illustrated in FIG. 4, "consider the balance of the image" is set as the image processing rule. The image processing using this rule determines a centroid in an image and processes the image based on the centroid.

Figure 7:
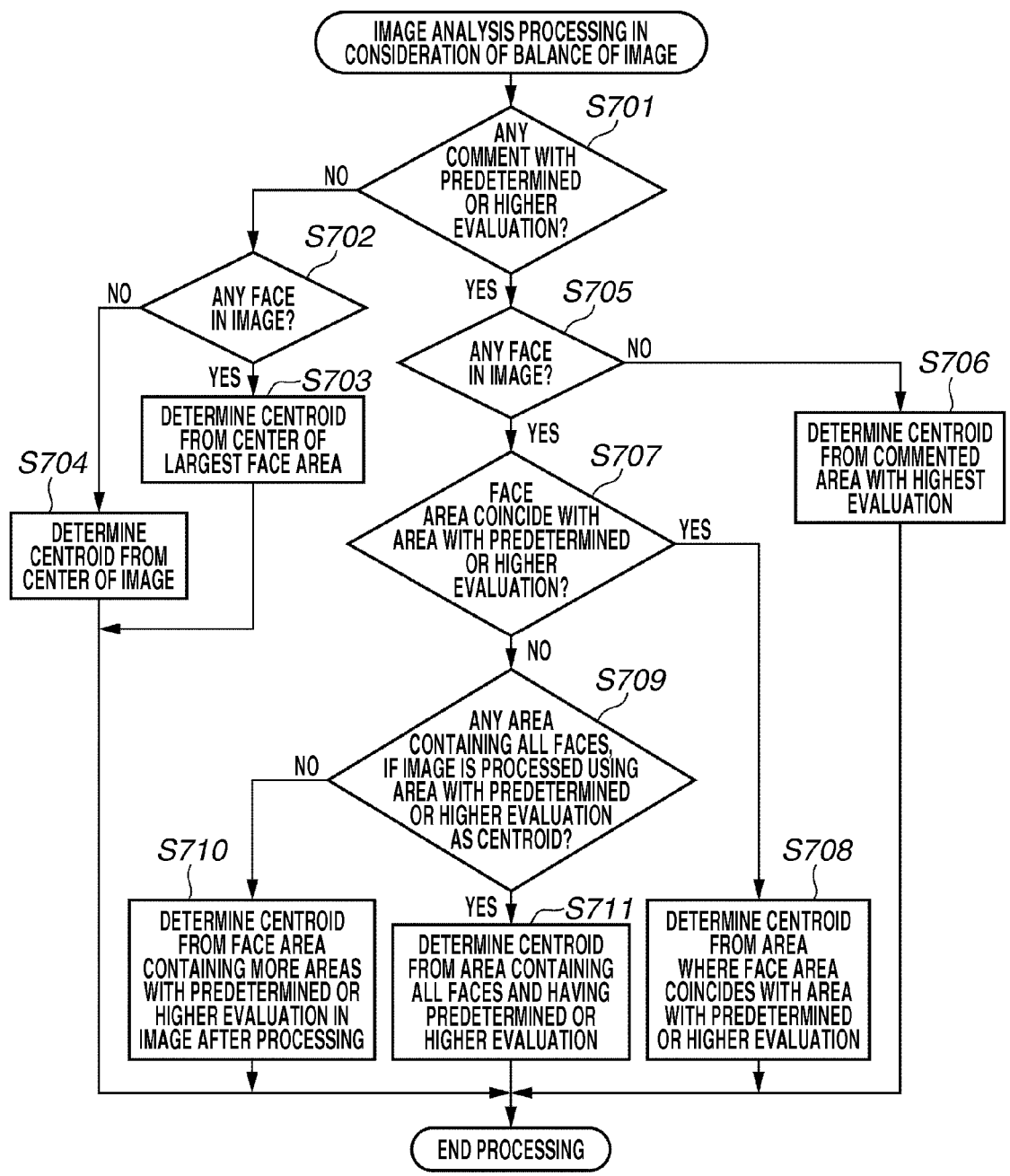
FIG. 7 is a flowchart illustrating an example of image analysis processing according to a second exemplary embodiment.

FIG. 7 is a flowchart illustrating an example of the image analysis processing in step S403 when the rule "consider the balance of the image" is set as the image processing rule.

In step S701, the analysis unit 104 determines whether the input image includes any comment of predetermined or higher evaluation. The predetermined evaluation may be determined in advance as, for example, a plus/minus comment of plus two or higher points. Alternatively, the predetermined evaluation may be determined based on a user's input. In step S701, if there is no comment of predetermined or higher evaluation (NO in step S701), the processing proceeds to step S702.

In step S702, the analysis unit 104 performs face detection processing in the image, and determines whether there is any face in the image. If a face is detected in step S702 (YES in step S702), the processing proceeds to step S703. In step S703, the analysis unit 104 determines the center of the largest face area as the centroid of the image, and stores the coordinate information of that area into the RAM 204. Then, the processing is ended. On the other hand, if no face is detected in step S702 (NO in step S702), the processing proceeds to step S704. In step S704, the analysis unit 104 determines the centroid from the center of the image. Then, the processing is ended.

In step S701, if the analysis unit 104 detects a comment of predetermined or higher evaluation (YES in step S701), the processing proceeds to step S705. In step S705, the analysis unit 104 performs face detection processing in the image to determine whether there is any face in the image. If no face is detected in step S705 (NO in step S705), the processing proceeds to step S706. In step S706, the analysis unit 104 determines the centroid from the commented area having the highest evaluation, and then the processing is ended.

On the other hand, if a face is detected in step S705 (YES in step S705), the processing proceeds to step S707. In step S707, the analysis unit 104 determines whether the face area coincides with the area with predetermined or higher evaluation. If the face area coincides with the area with predetermined or higher evaluation (YES in step S707), the processing proceeds to step S708. In step S708 the analysis unit 104 determines the centroid from the area where the face area coincides with the commented area with predetermined or higher evaluation, and then the processing is ended.

If there is a plurality of areas where the face area coincides with the area with predetermined or higher evaluation, the analysis unit 104 selects the area having the highest evaluation. On the other hand, if the face area does not coincide with the area with predetermined or higher evaluation (NO in step S707), the processing proceeds to step S709.

In step S709, the analysis unit 104 determines whether there is any commented area that contains all faces if the image processing is applied by using the commented area with predetermined or higher evaluation as the centroid. The centroid is an area that will become the center of the image after the processing. The analysis unit 104 determines whether all of the detected faces will be contained in the processed image after execution of the processing based on the image processing rule "consider the balance of the image" and other set image processing rules.

If there is no commented area that contains all of the detected faces if the processing is applied using the commented area with predetermined or higher evaluation as the centroid (NO in step S709), the processing proceeds to step S710. In step S710, the analysis unit 104 determines the centroid from the face area that will contain areas with predetermined or higher evaluation as many as possible in the image after the processing. The centroid may be determined from a predetermined area in the image that will contain face areas and commented areas with predetermined or higher evaluation as many as possible in the image after the processing.

On the other hand, in step S709, if there is a commented area that contains all of the detected faces (YES in step S709), the processing proceeds to step S711. In step S711, the analysis unit 104 determines the centroid from the commented area that contains all of the faces and has predetermined or higher evaluation. Then, the processing is ended. The processing flow has been described assuming that the centroid is an area, but the centroid may be a single point or an axis.

Figure 8:
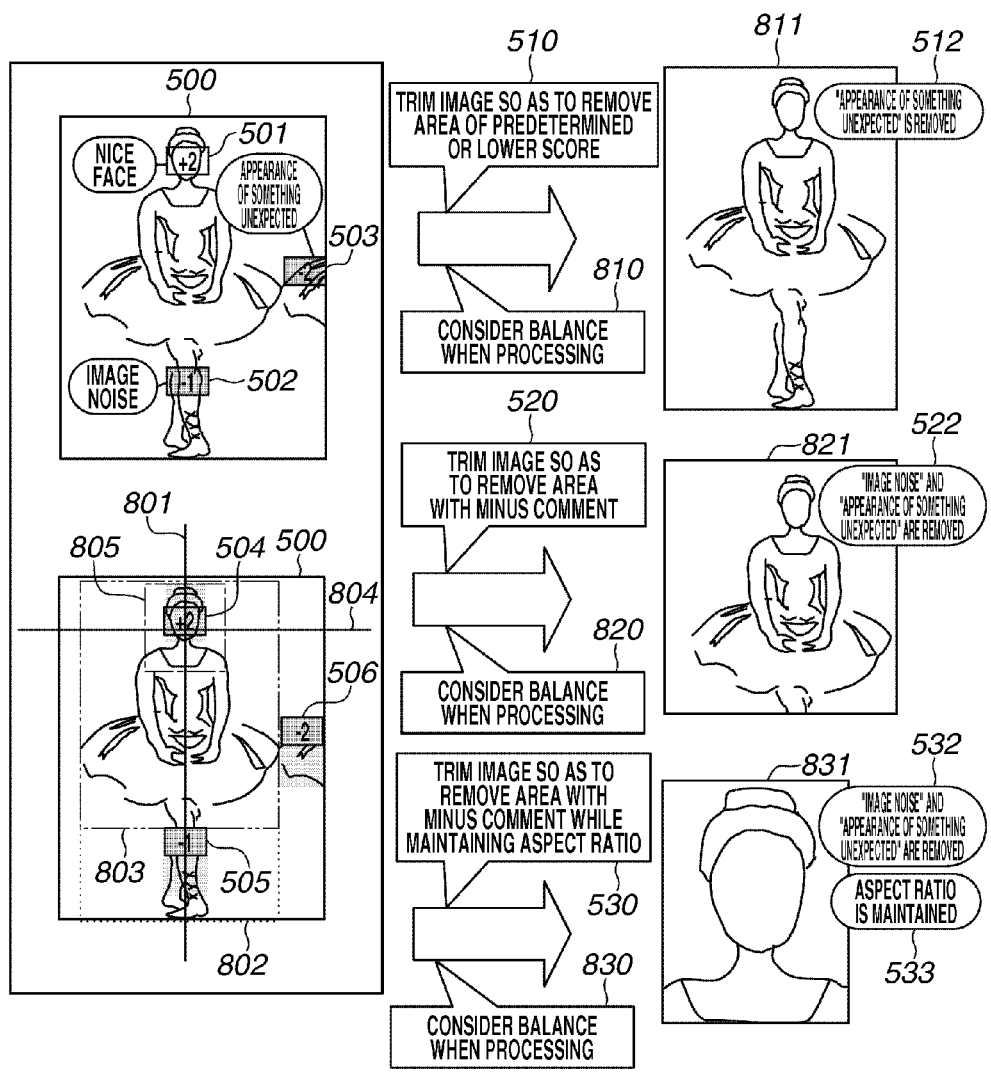
FIG. 8 illustrates an example of image processing results according to the second exemplary embodiment.

FIG. 8 illustrates an example of results of the image processing based on the centroid determined by "considering the balance of the image" as described above. The image 500 illustrated in FIG. 5 is used as an input image which is a processing target. In addition, the example illustrated in FIG. 8 will be described using an axis as the centroid. The centroid axis is a straight line passing through the area determined as the centroid. The image is processed so that the image after the processing becomes symmetric about the centroid axis in terms of size.

Further, the rule for processing the image 500 acquired in this example is the rule 510 "trim image so as to remove area of predetermined or lower score", which is the same as the first exemplary embodiment. Similarly, the analysis unit 104 acquires the rule 520 "trim image so as to remove area with minus comment", and the rule 530 "trim image so as to remove area with minus comment while maintaining original aspect ratio". Further, rules 810, 820, and 830 "consider centroid when processing (consider balance of image when processing)" are also set.

In the analysis processing of the image 500 illustrated in FIG. 7, if the predetermined evaluation is set to a plus comment of plus two points, the face area coincides with the commented area of the predetermined evaluation. Therefore, the analysis unit 104 performs the processing in steps S701, S705, S707, and S708, and then determines the centroid axis from a line segment 801 passing through an area 504 with the plus comment 501.

First, the analysis unit 104 analyzes the image 500 so that the image is trimmed along a frame 802 according to the centroid axis 801 and the rule 510 "trim image so as to remove area of predetermined or lower score". Then, the processing unit 105 trims the image 500 along the frame 802 to generate an image 811. Further, the analysis unit 104 also analyzes the image 500 so that the image is trimmed along a frame 803 according to the centroid axis 801 and the rule 520 "trim image so as to remove area with minus comment". Then, the processing unit 105 generates an image 821.

The image processing according to the rule 530 "trim image so as to remove area with minus comment while maintaining original aspect ratio" will be described, further taking a centroid axis 804 into consideration. The analysis unit 104 analyzes the image 500 so that the image is trimmed along a frame 805 while being centered on the centroid axes 801 and 804 and complying with the rule 530. Then, the processing unit 105 generates an image 831.

At this time, in the present exemplary embodiment, a comment such as "processing is completed with proper balance maintained" can be further added to the image in the comment addition processing in step S405.

As described above, according to the present exemplary embodiment, since the centroid of an image after the processing is determined based on a comment added to the image, it is possible to generate a well balanced image in terms of a target area in the image. Further, since the centroid of the image can be set to an area having predetermined or higher evaluation in the image, it is possible to arrange the center of the image after the processing within the target area. Further, since the centroid is determined in consideration of an object such as a face in an image, it is possible to appropriately set the composition of the image after the processing.

The present exemplary embodiment is described based on the image processing apparatus configured to determine the centroid taking only a commented area and a face area into consideration, but the centroid may be determined taking any object into consideration instead of a face. Further, the image processing apparatus may be configured to acquire the centroid position from a plane figure connecting a plurality of commented areas. Further, the centroid may be determined based on an area that is not targeted, such as an area with a minus comment.

The first and second exemplary embodiments are described based on the image processing method according to a plus/minus comment added to an image, which indicates the evaluation, the excellence/poorness, and the level of a specified area in the image. A third exemplary embodiment will be described as an example of image processing based on a memo comment. An image processing apparatus according to the present exemplary embodiment is similar to that in the first exemplary embodiment.

FIG. 9 illustrates a processing target image and a generated image which is a processing result according to the present exemplary embodiment. A processing target image 900 illustrated in FIG. 9 is processed based on a comment 901 added to the image 900. The comment 901 "dark backlight state" is added to a face area.

Figure 4:
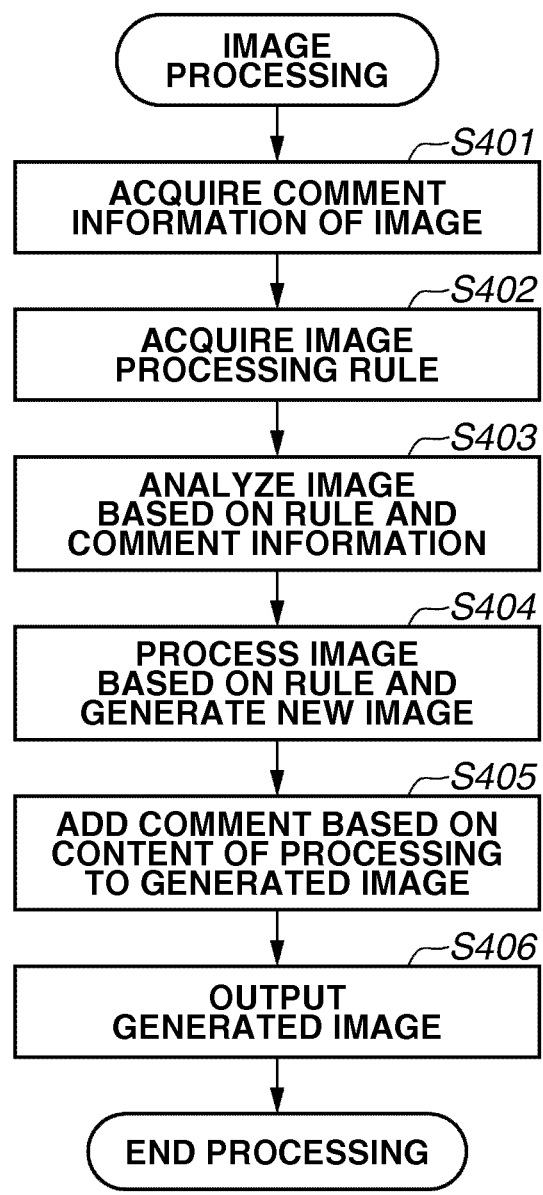
FIG. 4 is a flowchart illustrating an example of image processing.

In the present exemplary embodiment, during the image processing illustrated in FIG. 4, the analysis unit 104 acquires the image 900 in step S401, and acquires a rule 910 "process image based on content of comment" in step S402. In step S403, the analysis unit 104 interprets the content of the comment 901 by performing the natural language processing or referring to the identification code table stored in advance in the image processing apparatus 101 according to the rule 910 "process image based on content of comment". Then, the analysis unit 104 determines the content of the image processing to be applied from the content of the comment.

For example, the analysis unit 104 determines the content of the image processing in the following manner. The image processing apparatus 101 stores a table containing the content of processing and the content of the comment corresponding, which are associated with each other, in the storage unit 102 in advance. Then, the analysis unit 104 acquires the content of a comment added to an image, and determines the content of the processing by referring to the table. As an example of a processing content corresponding to a comment, if a comment "red eye" is added to an image, the analysis unit 104 detects an eye and determines that the content of the processing is red-eye correction processing for correcting the color of the eye area. Further, if a comment "out of focus" is added to an image, the analysis unit 104 determines that the content of processing is out-of-focus correction processing, for example, two-dimensional un-sharp masking processing.

The processing "backlight correction" is set as processing corresponding to the comment 901 "dark backlight state" added to the image 900 illustrated in FIG. 9, and the analysis unit 104 determines that the content of the processing for the comment 901 is the processing "backlight correction". In step S404, the processing unit 105 performs image processing such as extension of the brightness and color distribution in the commented area, and generates a brightly processed image 911 from the image 900.

Subsequently, in step S405, the addition unit 106 adds a comment to the generated image. At this time, the addition unit 106 refers to the comment 901 "dark backlight state", and adds a comment 912 "dark backlight state is corrected" to the image 911. In step S406, the image processing apparatus 101 outputs the commented image 911.

As described above, according to the present exemplary embodiment, it is possible to process an image according to the content of a comment added to the image. For example, it is possible to automatically perform image processing for improving an image, even if the image is a defect image with a minus comment.

Figure 11A:
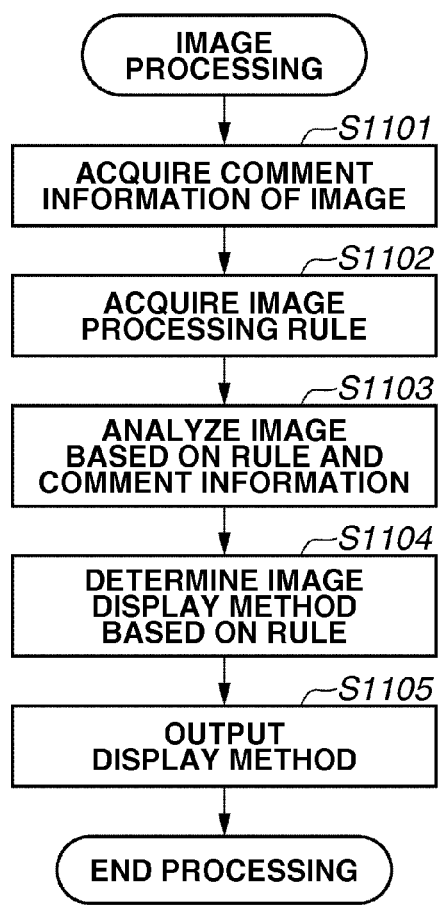
FIGS. 11A and 11B are flowcharts illustrating an example of image display control processing according to a fourth exemplary embodiment.

A fourth exemplary embodiment will be described as another embodiment of processing based on a result of image processing performed in step S304 illustrated in FIG. 3. The present exemplary embodiment controls a display with use of a display effect such as zooming, zooming-out, and panning based on a comment added to an image at the time of a display of the processing target image, as processing based on a result of image processing. FIG. 11A illustrates the image processing performed in step S303 illustrated in FIG. 3 according to the present exemplary embodiment.

Referring to FIG. 11A, in step S1101, the analysis unit 104 acquires comment information of a processing target image. In step S1102, the analysis unit 104 acquires an image display rule. The image display rules include, for example, "display the image while zooming in on the plus comment" and "zoom out on the image without displaying the minus comment". Further, the image display rules may include what type of display processing is performed and how long the image is displayed, and a definition of an order of display of the commented areas and how to switch the commented areas. For example, the image display rule may be prepared to set such that an area with a plus comment is displayed for a longer time.

Subsequently, in steps S1103 and 1104, the analysis unit 104 analyzes the acquired rule and the comment information to determine how to display the target image. In step S1105, the analysis unit 104 outputs the determined display method to the display control unit 107.

Figure 3:
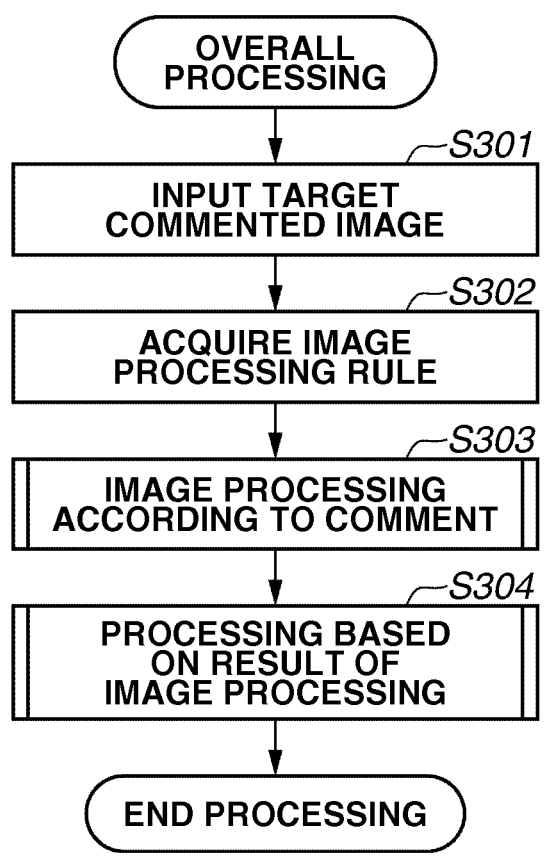
FIG. 3 is a flowchart illustrating an example of overall processing of the image processing apparatus according to the exemplary embodiment of the present invention.
Figure 11B:
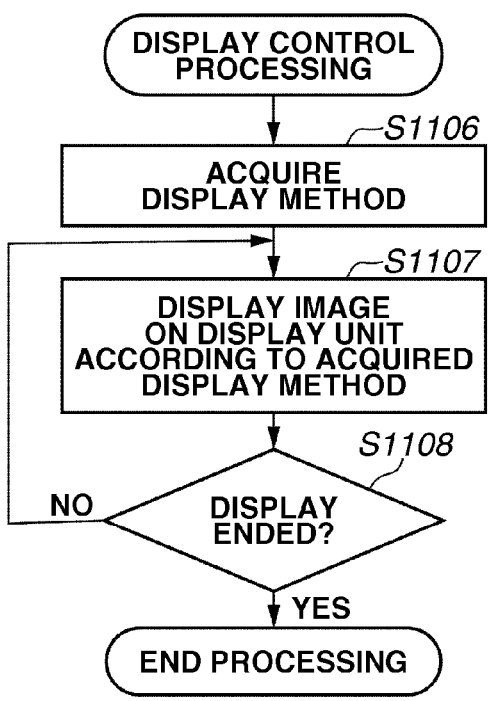

FIG. 11B illustrates processing (display control processing in the present exemplary embodiment) based on a result of image processing performed in step S304 illustrated in FIG. 3.

In step S1106, the display control unit 107 acquires the display method output in the above-described step S1105. In step S1107, the display control unit 107 loads the target image processed by the processing unit 105 to the RAM 204 while chronologically changing the target image according to the acquired display method. Further, the display control unit 107 controls the time during which the commented area is displayed on the display unit 108 according to the display method.

In step S1108, the display control unit 107 determines whether to end the display of the target image. If the display control unit 107 determines to end the display of the target image (YES in step S1108), the display control unit 105 ends the processing in this flowchart. If the display control unit determines to continue the display of the target image (NO in step S1108), the processing returns to step S1107 and the display control unit 107 continues controlling the display of the target image.

Figure 12A:
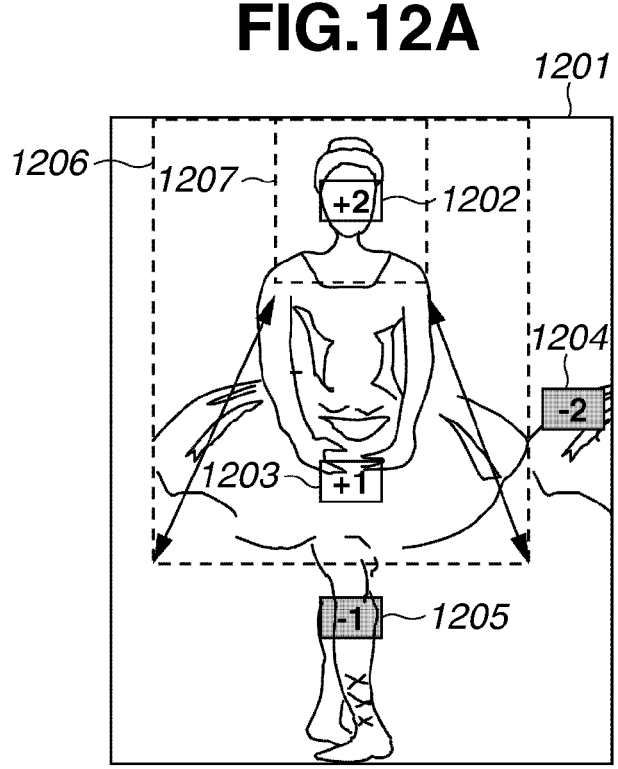
FIGS. 12A and 12B each illustrate an example of a result of the image display control processing according to the fourth exemplary embodiment.
Figure 12B:
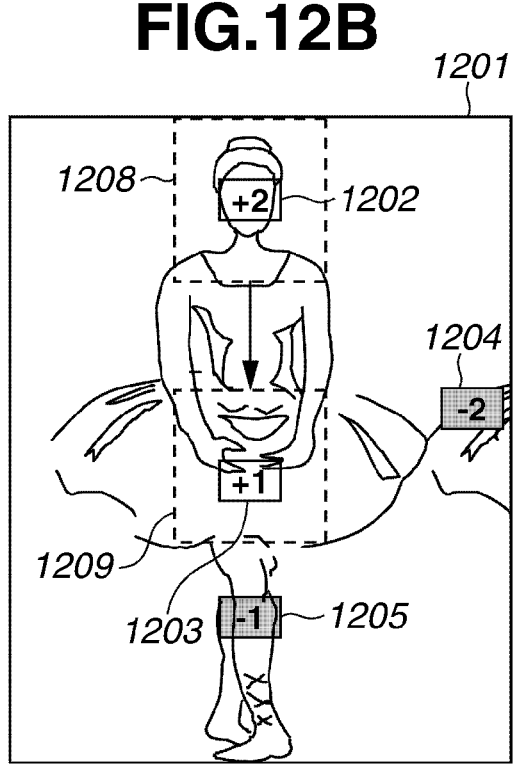

FIGS. 12A and 12B each illustrate an example of an image displayed on the display unit 108 by the display control according to the present exemplary embodiment. FIGS. 12A and 12B illustrate a target image 1201. Plus comments 1202 and 1203, and minus comments 1204 and 1205 are added to the image 1201. The description of memo comments will be omitted for simplification of the description.

The description will be provided assuming that the image display rules acquired in step S1102 are "zoom in and then zoom out on the plus comment without displaying the minus comment" and "pan from the plus comment to another plus comment without displaying the minus comment" by way of example.

FIG. 12A is an example of a display according to the rule "zoom in and then zoom out on the plus comment without displaying the minus comment". First, the display control unit 107 displays an area 1206 containing the plus comments 1202 and 1203 on the display unit 108 without displaying the minus comments 1204 and 1205. Then, the display control unit 107 performs zooming display control so as to gradually increase the magnification ratio and chronologically change the display to zoom in on an area 1207 so that the comment 1202, which has the highest score among the comments added to the image, is displayed in an enlarged manner. Further, the display control unit 107 displays the area 1207 for a predetermined time, and then performs zoom out display control so as to gradually reduce the magnification ratio and chronologically change the display from the area 1207 to the area 1206 again.

Further, FIG. 12B is an example of a display according to the rule "pan from the plus comment to another plus comment without displaying the minus comment". The display control unit 107 displays an area 1208 containing the plus comment 1202 on the display unit 108 without displaying the minus comments 1204 and 1205. Then, the display control unit 107 performs a panning display in an area 1209 containing another plus comment 1203 with use of a route that does not contain the minus comments 1204 and 1205.

The present exemplary embodiment determines the display method according to the score of a comment. However, the image processing apparatus may be configured to determine the display method based on the content of a memo comment. For example, the analysis unit 104 interprets the content of a comment by, for example, the natural language processing, and determines that the area will be displayed preferentially if the comment includes a positive content to display the area for a longer time compared to other areas. Further, the analysis unit 104 determines that the area should not be displayed if the comment includes a negative content, and displays the area for a shorter time compared to other areas.

Further, if a comment "firework" is added to an image, the display control unit 107 controls the display to appear in slide-in like being opening up upwardly. Further, for example, if a comment "out of focus" is added to an image, the display control unit 107 controls the display to apply appropriate processing such as blurring the entire image or making the image more transparent. The display control unit 107 may provide a background display by superimposing an image over another image. Further, the display control unit 107 may use a display effect such as zooming-in after displaying an entire image. Furthermore, the display control unit 107 may control the display by combining display effects such as zooming-in, zooming-out, and panning.

Further, the display control unit 107 may utilize a comment in a slide-show display of controlling a display of a plurality of images. In this case, the display time is changed according to the total number of comments added to each image. In other words, the display control unit 107 can display an image with many plus comments, which should be displayed, for a longer time. Further, for example, when the display control unit 107 displays an image with a comment "sports", the display control unit 107 may control the display to realize a fast and dynamic transition of images (cause image to quickly slide in).

As described above, according to the present exemplary embodiment, it is possible to automatically realize display control of emphasizing an area to be displayed in an image by utilizing a comment. Further, it is possible to display an image while zooming in an area to be displayed in an image. Further, it is possible to display an image while emphasizing an area to be displayed in an image by especially increasing the display time of it.

Further, it is possible to effectively display an image by zooming in or zooming out a plurality of image areas in a single image. Further, it is possible to automatically hide an area that should not be displayed in an image. Further, when the display control unit 107 displays an area that should not be displayed, it is possible to realize display control of, for example, reducing the display time of that area. Further, it is possible to effectively display an image by panning a plurality of areas to be displayed in an image.

A fifth exemplary embodiment will be described as an example of processing and outputting a comment to be displayed at the time of an image display. According to the present exemplary embodiment, the content of a comment is displayed by being superimposed on an image when the processed image is displayed, as processing based on a result of image processing performed in step S304 illustrated in FIG. 3. The image processing apparatus 101 according to the present exemplary embodiment includes a unit for outputting an audio signal.

In the present exemplary embodiment, for example, an "I-am-talking mode" and a "somebody-is-talking mode" are defined in advance as the comment processing methods. Further, for example, a female type, a male type, and an age-specific type may be prepared for "somebody-is-talking mode". The image processing apparatus 101 stores a conversion table containing word endings and word choices corresponding to these comment processing methods in the storage unit 102, and refers to the table when processing a comment. In this way, the image processing apparatus 101 can change the ending of a word and a word choice in a comment to be output by the comment processing. The comment processing method may be selected by a user, or may be automatically set according to the attribute of a person who added a comment to an image.

FIG. 10 illustrates an example of the comment processing according to the present exemplary embodiment. In this example, the "somebody-is-talking mode (female type)" is set as the comment processing method, and a comment 1001 "nice face" is processed according to the "somebody-is-talking mode (female type)", as a result of which a comment 1011 "it is a nice face" is generated. When the commented area is displayed, the generated comment is output together therewith. Similarly, comments 1002 and 1003 are also processed into comments 1012 and 1013, and are output as them.

Further, for example, if the "I-am-talking mode" is set as the comment processing method, the comment 1001 "nice face" is processed into, for example, "My face is nice, isn't it?" with the ending of the comment and the word choices changed, and then is output as it. Further, when the content of a comment is output, it may be output as an audio signal. With the "somebody-is-talking mode" set as the comment processing method, the comment may be output through a female voice or male voice according to the set mode.

As described above, it is possible to realize an image display with the improved entertainment feature by processing and outputting a comment at the time of a display of the image.

The image processing apparatus may be configured in such a manner that the processing based on a result of image processing according to the above-described exemplary embodiments is output to an external apparatus connected to the communication apparatus 208. Further, the image processing apparatus 101 may be provided with a function as a web server and may be configured to input or output information from or to an external apparatus as a client. For example, the image processing apparatus 101 may be configured to acquire an input image from a client external apparatus via the communication apparatus 208, and output an image generated by the image processing to the external apparatus via the communication apparatus 208.

Further, the present invention can be also embodied by performing the following processing, i.e., processing of providing a system or an apparatus with software (program) capable of realizing the functions of the above-described exemplary embodiments via a network or various types of storage media, and causing a computer (or, for example, a CPU or a micro processing unit (MPU)) of the system or the apparatus to read out and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-278566 filed Dec. 14, 2010, which is hereby incorporated by reference herein in its entirety.

What is claimed is:

1. An image processing apparatus comprising:
   an identification unit configured to identify a specified area in an image, textual information as a comment added to the specified area and numeral information as a score added to the specified area;
   an acquisition unit configured to acquire a rule according to the comment and the score for processing the image; and
   a processing unit configured to process the image based on the comment, the score and the specified area identified by the identification unit, and the rule acquired by the acquisition unit.

2. The image processing apparatus according to claim 1, wherein the processing unit trims the image so as to remove the specified area.

3. The image processing apparatus according to claim 1, wherein the processing unit trims the image so as not to remove the specified area.

4. The image processing apparatus according to claim 1, wherein the comment and the score of the specified area includes information regarding a color of the specified area or information regarding a brightness of the specified area.

5. The image processing apparatus according to claim 1, further comprising a determination unit configured to determine a centroid of the image based on the specified area and the comment and the score of the specified area which are identified by the identification unit,
   wherein the processing unit processes the image so that the centroid determined by the determination unit becomes a centroid of a processed image.

6. The image processing apparatus according to claim 1, wherein the acquisition unit acquires a plurality of rules, and
   wherein the processing unit processes the image based on the plurality of rules, and generates a plurality of processed images respectively corresponding to the plurality of rules.

7. The image processing apparatus according to claim 1, further comprising an addition unit configured to add a content of the processing performed by the processing unit to a processed image.

8. The image processing apparatus according to claim 1, further comprising an update unit configured to update a content of the comment and the score added to the image based on a content of the processing performed by the processing unit.

9. The image processing apparatus according to claim 1, further comprising a display control unit configured to display an image processed by the processing unit on a display unit, and display the displayed image while changing the image chronologically.

10. The image processing apparatus according to claim 9, wherein the display control unit controls a display so as not to display the specified area.

11. The image processing apparatus according to claim 9, wherein the display control unit performs display control so as to display the specified area while zooming in, zooming out, or panning the specified area.

12. The image processing apparatus according to claim 9, wherein, in a case where a plurality of specified areas is identified by the identification unit, the display control unit performs display control so as to display the specified areas while panning from the identified specified area to another specified area.

13. The image processing apparatus according to claim 9, wherein the display control unit changes a display time of the specified area to which the comment and the score are added based on the comment and the score identified by the identification unit.

14. The image processing apparatus according to claim 1, wherein the processing unit applies image processing to the specified area according to the evaluation added to the specified area.

15. A method for processing an image, the method comprising:
   identifying a specified area in an image, textual information as a comment added to the specified area and numerical information as a score added to the specified area;
   acquiring a rule according to the comment and the score for processing the image; and
   processing the image based on the comment, the score and the specified area identified by the identification, and the acquired rule.

16. A non-transitory computer-readable storage medium storing a program for causing a computer to execute a method according to claim 15.

* * * * *